United States Patent [19]

Nickles et al.

[11] Patent Number: 4,853,883

[45] Date of Patent: Aug. 1, 1989

[54] APPARATUS AND METHOD FOR USE IN SIMULATING OPERATION AND CONTROL OF A RAILWAY TRAIN

[76] Inventors: Stephen K. Nickles, 1223 Peck; Jim B. Surjaatmadja, 2309 N. West Club Rd.; John E. Haley, 5420 Day; Lynn K. Wienck, 4417 N. Odom Dr., all of Duncan, Okla. 73533

[21] Appl. No.: 118,841

[22] Filed: Nov. 9, 1987

[51] Int. Cl.[4] .................... G05B 17/02; G05D 13/00; G06F 13/00
[52] U.S. Cl. .................................... 364/578; 358/104; 364/426.05; 439/29
[58] Field of Search .................... 364/424, 426, 578; 358/104, 180; 434/29

[56] References Cited

U.S. PATENT DOCUMENTS

| | | | |
|---|---|---|---|
| 2,609,489 | 9/1952 | Roman | 246/122 R |
| 3,046,676 | 7/1962 | Hermann et al. | 434/12 |
| 3,240,929 | 3/1966 | Hughson | 246/167 R |
| 3,507,993 | 4/1970 | Mulley | 358/103 |
| 3,515,802 | 6/1970 | Wise | 358/104 |
| 3,569,925 | 3/1971 | Tyler et al. | 340/995 |
| 3,621,131 | 11/1971 | Wolff | 358/104 |
| 3,639,731 | 2/1972 | McNeill | 364/424 |
| 3,655,962 | 4/1972 | Koch | 246/187 B |
| 3,696,758 | 10/1972 | Godinez, Jr. | 105/61 |
| 3,725,563 | 4/1973 | Woycechowsky | 358/104 |
| 3,864,731 | 2/1975 | Callahan | 360/5 |
| 4,031,363 | 6/1977 | Freeman et al. | 364/424 |
| 4,042,310 | 8/1977 | Mosier | 364/424 |
| 4,236,215 | 11/1980 | Callahan et al. | 364/436 |
| 4,241,403 | 12/1980 | Schultz | 364/300 |
| 4,395,624 | 7/1983 | Wartski | 377/15 |
| 4,561,057 | 12/1985 | Haley, Jr. et al. | 364/436 |
| 4,722,007 | 1/1988 | Fling | 358/180 |
| 4,763,194 | 8/1988 | Osman | 358/180 |

FOREIGN PATENT DOCUMENTS 2095408 9/1982 United Kingdom.
2096078 10/1982 United Kingdom.

OTHER PUBLICATIONS

TV Educator (Brochure) Video Engineering Co. of Washington, D.C.
"New Train Dynamics Simulator" from the Mar., 1975 issue of *Progressive Railroading*, pp. 39–41.
Brochure (FM2026-5/75-4M) on the FreightMaster Train Dynamics Analyzer Operator's Manual (Part No. 87.904) on the FreightMaster Train Dynamics Analyzer.
"Train Control Analyzer-A New Concept For Improving Freight Train Handling" dated Oct. 19, 1974.
"Railroad Train Simulator" of Conductron-Missouri, a Division of Conductron Corporation.
"DSL Locomotive Training Simulators" of DSL Dynamic Sciences Limited.
"The Dynamics of the Locomotive Simulator" by G. B. Adams of Southern Pacific Transportation Company.
FreightMaster SDA TM Meter System brochure.
"The Train Handling Indicator" presented by R. E. Tyler.
"Train Handling Indicator" with Reflectone logo and name.
Harris PROBE system brochure, Jun. 1982.
"Microprocessor-Based System for Roll-Down and Acceleration Tests" by D. K. Lynn and C. Derouin.
"Microprocessor Based Data Acquisition System" by V. V. Athani, *Microprocessors and Microsystems*, vol. 3, No. 8 (Oct. 1979), pp. 359–364.

Primary Examiner—Felix D. Gruber
Attorney, Agent, or Firm—Laney, Dougherty, Hessin & Beavers

[57] ABSTRACT

An apparatus for use in a railway train simulator includes a control station which has a first microcomputer for receiving and transmitting, via a conventional transmission protocol, train simulation signals to a second microcomputer. The second microcomputer provides master control for the apparatus. The second microcomputer is adapted to link with and operate from multiple control stations and multiple computer control terminals. Information is provided in an enhanced manner through one or more color graphics terminals, plotters and printers. Displays of simulated trains and track selections can be displayed at different, selectable scales.

6 Claims, 11 Drawing Sheets

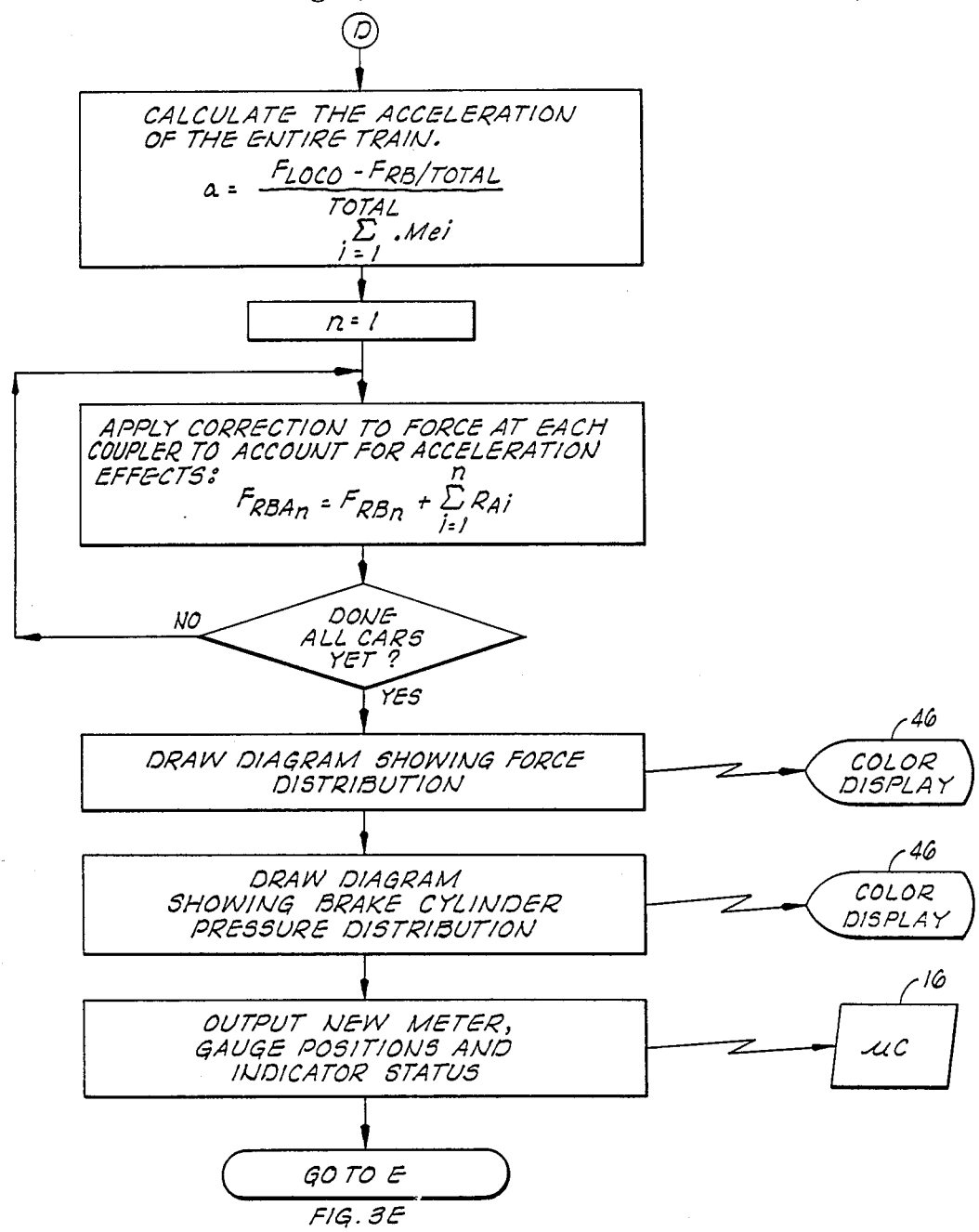
FIG. 3E
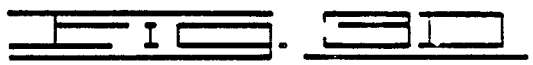

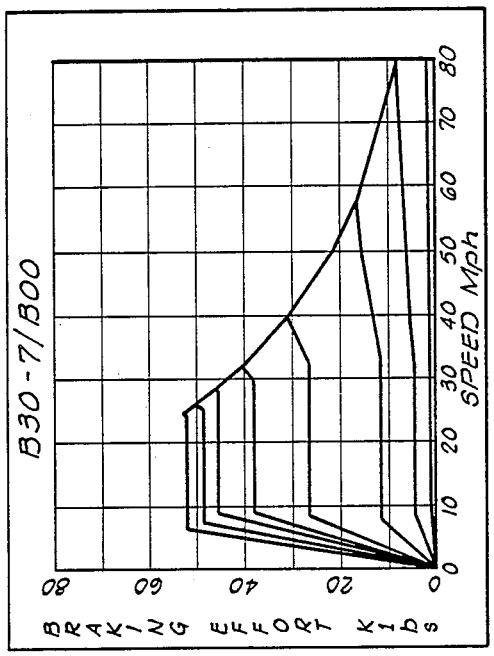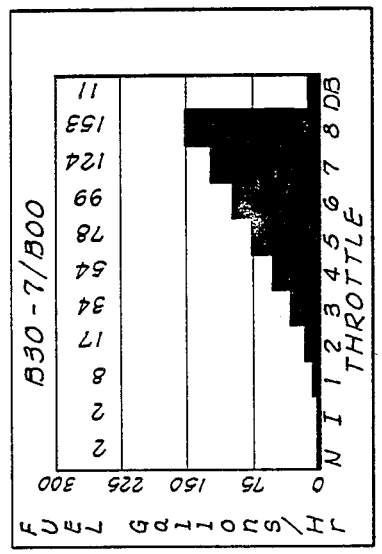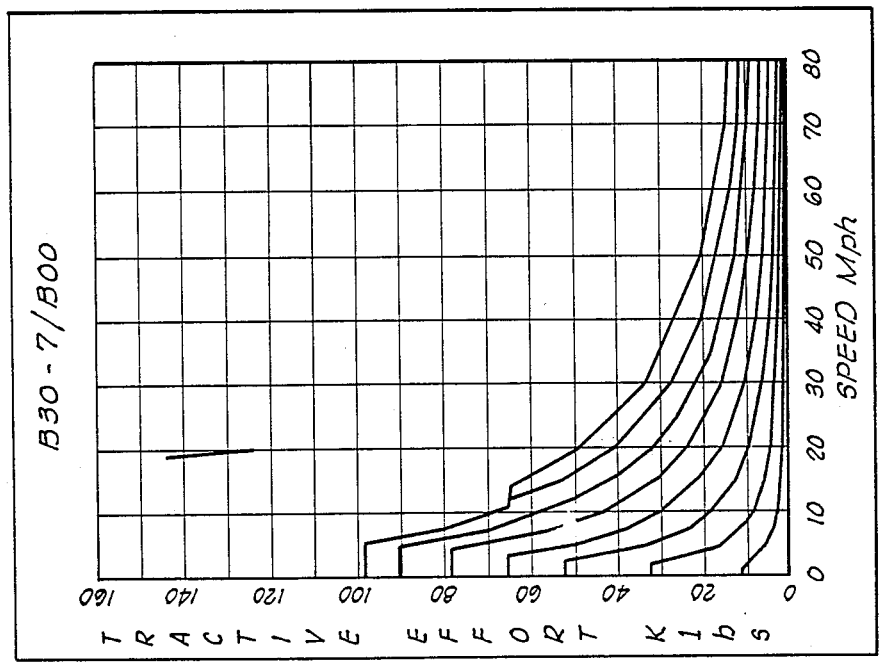
FIG. 7

APPARATUS AND METHOD FOR USE IN SIMULATING OPERATION AND CONTROL OF A RAILWAY TRAIN

BACKGROUND OF THE INVENTION

This invention relates generally to apparatus and methods for use in simulating operation and control of a railway train. The invention more particularly, but not by way of limitation, relates to an apparatus and method for enhancing the railway train control simulator and method disclosed in U.S. Pat. No. 4,041,283 issued Aug. 9, 1977, and assigned to the assignee of the invention described and claimed hereinbelow, which previously issued patent is incorporated herein by reference.

The need for a railway train simulator and method has been recognized, such as in the U.S. Pat. No. 4,041,283. This need has, to a degree, been satisfied by a simulator which has been constructed in accordance with the system disclosed in the U.S. Pat. No. 4,041,283 and which has been commercially used for several years. The need has arisen, however, for an enhanced apparatus and method which can be used in the simulation and analysis of the operation and control of a railway train.

One particular need which should be met by such an enhanced apparatus and method is improved interfacing with the equipment operator whereby he or she has greater flexibility in controlling simulations. This flexibility includes improved manual control of the apparatus by the operator, and it also includes providing an ability by which multiple or remote operators can control the apparatus.

Such an enhanced apparatus and method should also provide improved interfacing with the student or other apparatus user. That is, the user should be given both an improved visual picture of the simulation for better conducting the simulation and an enhanced report for better understanding the results of the simulation.

Such an enhanced apparatus and method should also provide improved interfacing with the instructor or evaluator by reporting more information about the simulation.

Such an improved apparatus and method should provide improved interfacing within the apparatus so that the apparatus has greater flexibility from the standpoint of configurations in which it can be connected. This flexibility includes being able to receive multiple simulation inputs and to receive simulation inputs from devices representing different types of simulated equipment. This flexibility also includes having the capability to connect different types of peripherals to receive different types of outputs from the apparatus.

SUMMARY OF THE INVENTION

The present invention comprises such an enhanced apparatus and method which provide the aforementioned improved interfacing features. The preferred embodiment of the present invention utilizes an improved computer control terminal, including a cathode ray tube screen and a keyboard, which gives the simulator operator greater flexibility in controlling the simulator; it also includes multiple input ports so that multiple computer control terminals can be connected into the apparatus for providing multiple control of the simulator. The preferred embodiment also permits remote control of the simulator.

The preferred embodiment also includes a color graphics terminal which gives an improved visual picture of the simulation to the student or other simulator user. The methodology of the present invention provides the capability of varying the scale of the pictured simulation to enhance the understanding which can be gained through the color graphics terminal. The instructor or evaluator, as well as the student, also benefits through the preferred embodiment of the present invention in that the invention provides more detailed information on visual displays and printed reports.

The preferred embodiment apparatus has a greater flexibility in that it can be adapted in different configurations. In particular, the preferred embodiment is adapted to receive inputs from multiple control stations where the different students or simulator users generate the simulated railway train operational signals, and it is also adapted to receive inputs from control stations which can represent different types of equipment to be simulated (e.g., one station could represent a diesel locomotive and another station could represent an electric locomotive). The apparatus of the preferred embodiment is also adapted to connect to a printed and a plotter by which both textual and graphical information can be provided on hard copy.

With respect particularly to the apparatus of the present invention, this apparatus is for use in simulating operation and control of a railway train. The apparatus comprises: a control station including: a plurality of train operating controls, each for providing a respective signal related to the degree of operation thereof by a control station operator; and a first computer connected to the plurality of train operating controls so that a plurality of signal transmission circuits, over which the respective signals from the train operating controls are communicable to the first computer, are defined; display means for displaying alphanumeric data and graphical representations to depict the operation and control of a railway train to be simulated; a second computer including an output connected to the display means; and serial communication link means for connecting the first computer and the second computer so that a serial signal communication circuit, over which any of the respective signals communicable to the first computer are communicable to the second computer from the first computer, is defined between the first and second computers.

In the preferred embodiment, the second computer further includes a plurality of serial data input ports adapted to be connected to a plurality of control stations, one of which serial data input ports is connected to the serial communication link means. Also in the preferred embodiment, the apparatus further comprises a computer control terminal including a cathode ray tube display screen and a keyboard connected thereto; in this embodiment the second computer further includes a plurality of computer control terminal input ports adapted to be connected to a plurality of computer control terminals, one of which computer control terminal input ports is connected to the computer control terminal which includes the cathode ray tube display screen and the keyboard. The display means of this preferred embodiment includes a color graphics terminal connected to the second computer, and the apparatus further comprises a printer, which is connected to the second computer so that alphanumeric data displayed through the color graphics terminal are printable onto hard copy, and a plotter, which is connected to the second computer so that graphical representations displayed through the color graphics terminal are plottable onto hard copy.

The method of the present invention, which is particularly useful for analyzing operation and control of a railway train, comprises: providing data related to track profile, train consist, and the location of the train on the track for a predetermined train and for a predetermined section of track over which the operation of the train is to be simulated; displaying at a first scale a visual representation of the predetermined train on a visual representation of the predetermined section of track in response to the data; and displaying at a second scale, different from the first scale, a visual representation of the predetermined train on a visual representation of a portion of the predetermined section of track.

In the preferred embodiment this method further comprises plotting onto hard copy the visual representation of the predetermined train on the visual representation of a portion of the predetermined section of track, and printing onto hard copy a selectable table of a respective parameter from a plurality of parameters including the quantity of fuel consumed by each of a plurality of energy consuming phenomena.

Therefore, from the foregoing, it is a general object of the present invention to provide a novel and improved apparatus and method for use in simulating operation and control of a railway train. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIGS. 3A-3E show a flow chart of the program for controlling a master microcomputer of the apparatus.

FIG. 7 is an illustrated display, from the color graphics display (and also plottable via the plotter), graphically showing locomotive characteristics.

DETAILED DESCRIPTION OF THE PREFERRED EMBODIMENT

U.S. Pat. No. 4,041,283 issued Aug. 9, 1977, and U.S. Pat. No. 4,042,810 issued Aug. 16, 1977, both assigned to the assignee of the present invention, are incorporated herein by reference.

Figure 1:
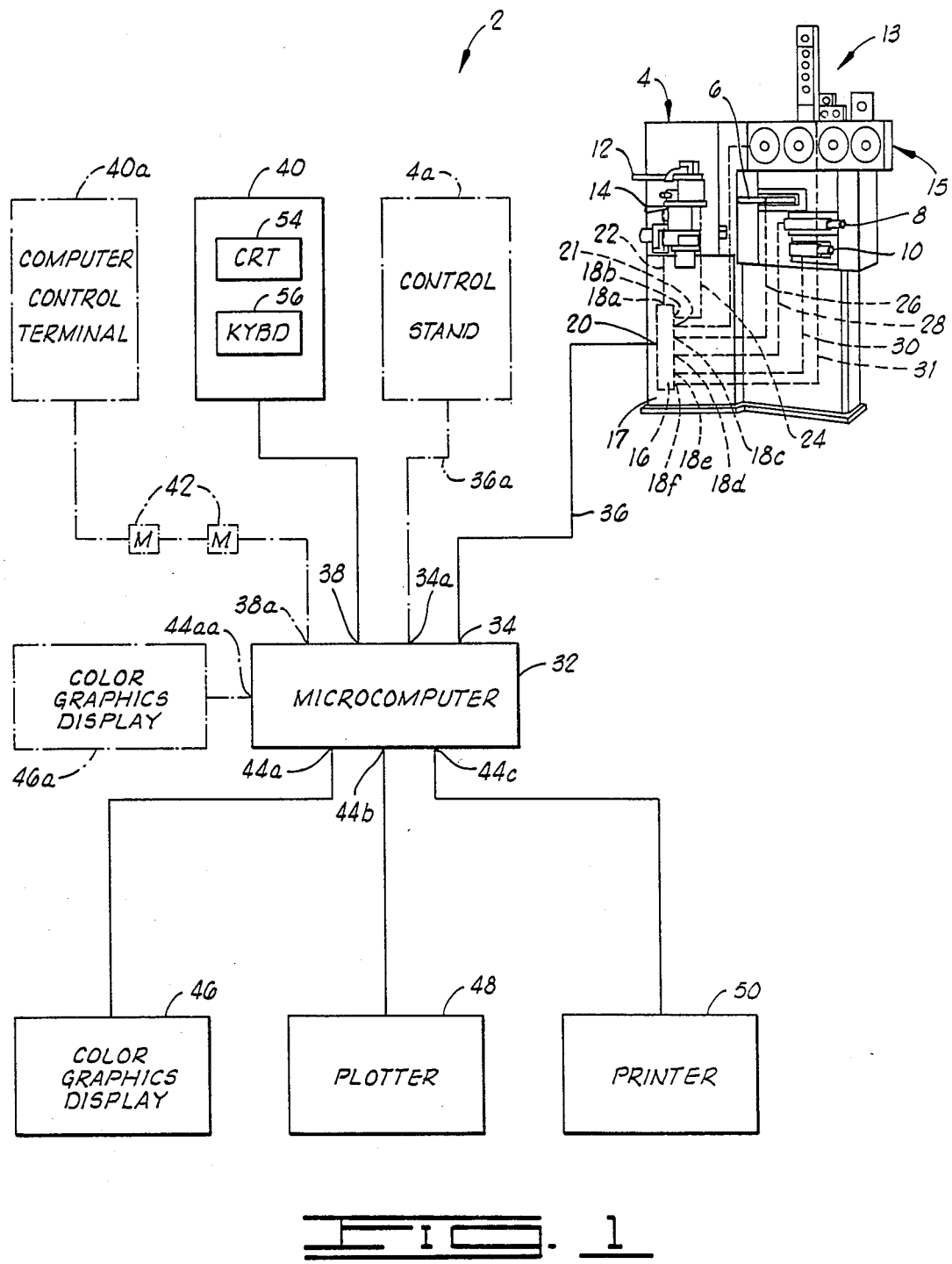
FIG. 1 is a block diagram of the preferred embodiment of the apparatus of the present invention, including a representation of a control station having conventional railway train locomotive controls.

The preferred embodiment of an apparatus 2 for use in simulating operation and control of a railway train is shown, mostly in block diagram format, in FIG. 1. The apparatus 2 includes a control station 4 at which a student or simulator user works to implement the railway train simulation. That is, the control station 4 contains the railway train control elements which generate signals representing a simulated operation of a railway train. The control station 4 is the same as the control stand 225 disclosed in the U.S. Pat. No. 4,041,283 (see, e.g., column 7, lines 54-66; column 7, line 68 -column 8, line 1; column 10, lines 11-34; and column 16, lines 18-30) except for one significant difference. The conventional features of the control station 4 common to those of the control stand 225 include an eight-notch dynamic brake control 6, an eight-notch power throttle 8, a sanding wobble stick 10, a train line air brake valve 2, and an independent locomotive air brake valve 14; a remote locomotive control unit 13 is mounted atop the control station 4, and meters and gauges and indicator lights and alarms 15 are mounted on the control station 4. The elements 6, 8, 10, 12, 13, 14 of the control station 4 define, at least in part, a plurality of train operating controls, each of which provides a respective signal related to the degree of operation thereof by a control station operator (such as a student who is undergoing training via the simulator for which the present invention is to be used). Connected to receive these signals is a computer 16, which represents the significant distinction between the control station 4 and the control stand 225, wherein these signals were simply hardwired through a cable containing one wire for each signal for connection to another part of the simulator disclosed in the U.S. Pat. No. 4,041,283.

The computer 16 of the preferred embodiment is a microcomputer mounted within an STD bus card cage contained in a housing 17 of the control station 4. The microcomputer 16 includes a Model 78C15 CPU card by PROLOG or VERSALOGIC, containing a Model 80C85 microprocessor by Intel or NEC, for example. Also included is a serial I/O card by which a two-channel RS-232 protocol port is established. This circuitry also includes a sixteen-channel analog input card, an eight-channel analog output card, and a forty-channel binary-input and sixteen-channel binary-output card. These components and their interconnections are conventional.

With respect to the computer 16 as illustrated in FIG. 1, it includes a plurality of input ports, six of which are specifically identified by the reference numerals 18a, 18b, 18c, 18d, 18e, 18f (any of which may represent multiple-wire connections as needed). The computer 16 also includes an RS-232 input/output (I/O) port 20 to which data received at the input ports are transferred. The data transferred to the I/O port 20 include those signals received at the plurality of inputs of the computer 16, such as through the inputs 18a, 18b, 18c, 18d, 18e, 18f, each of which inputs is connected to a respective one of the plurality of train operating controls through a respective signal transmission circuit, such as the wiring circuits 22, 24, 26, 28, 30, 31 identified in FIG. 1. The manner in which the signals communicable over the signal transmission circuits are received through the inputs 18 and transmitted through the I/O port 20 is shown in the program flow chart of FIG. 2. As is apparent from FIG. 2, this is a simple program which can be readily coded through known programming skills.

The computer 16 also includes output ports, generally represented by a port 21 in FIG. 1, through which control signals are communicated to the meters, gauges and indicator lights and alarms 15. The control signals are received by the computer 16 through the I/O port 20 under operation of the program depicted in FIG. 2.

Figure 2:
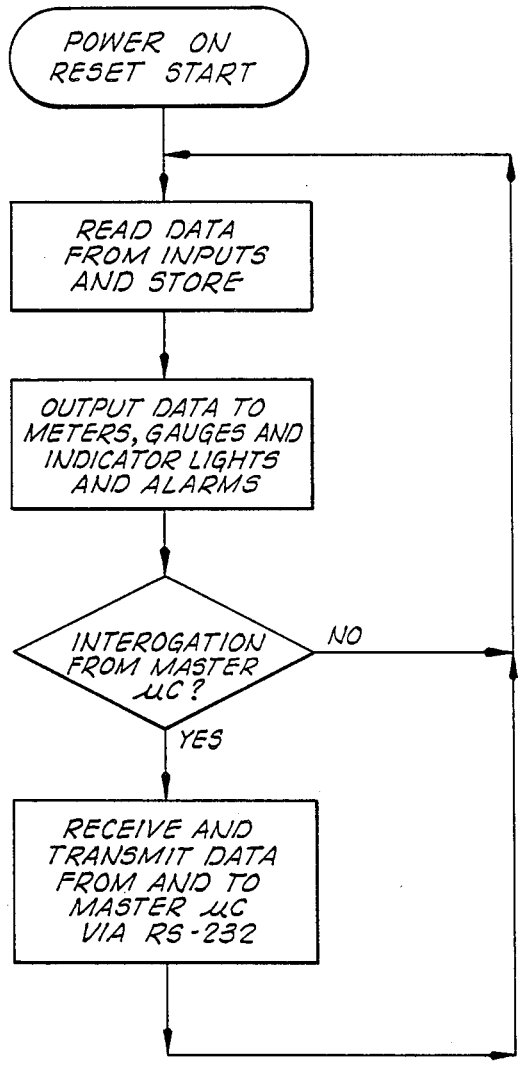
FIG. 2 is a flow chart of a program for controlling a microcomputer contained within the control station.
Figure 3A:
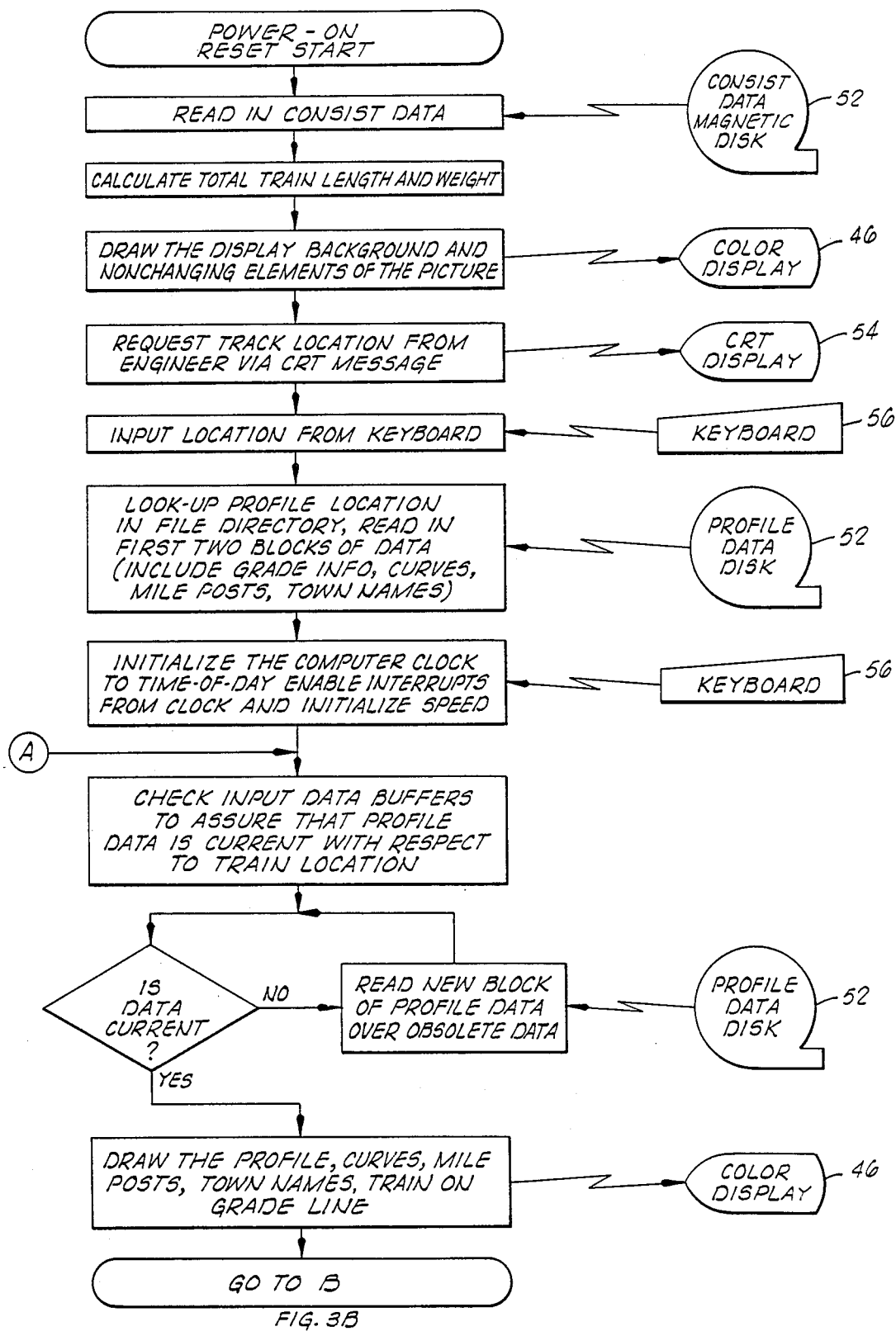
Figure 3B:
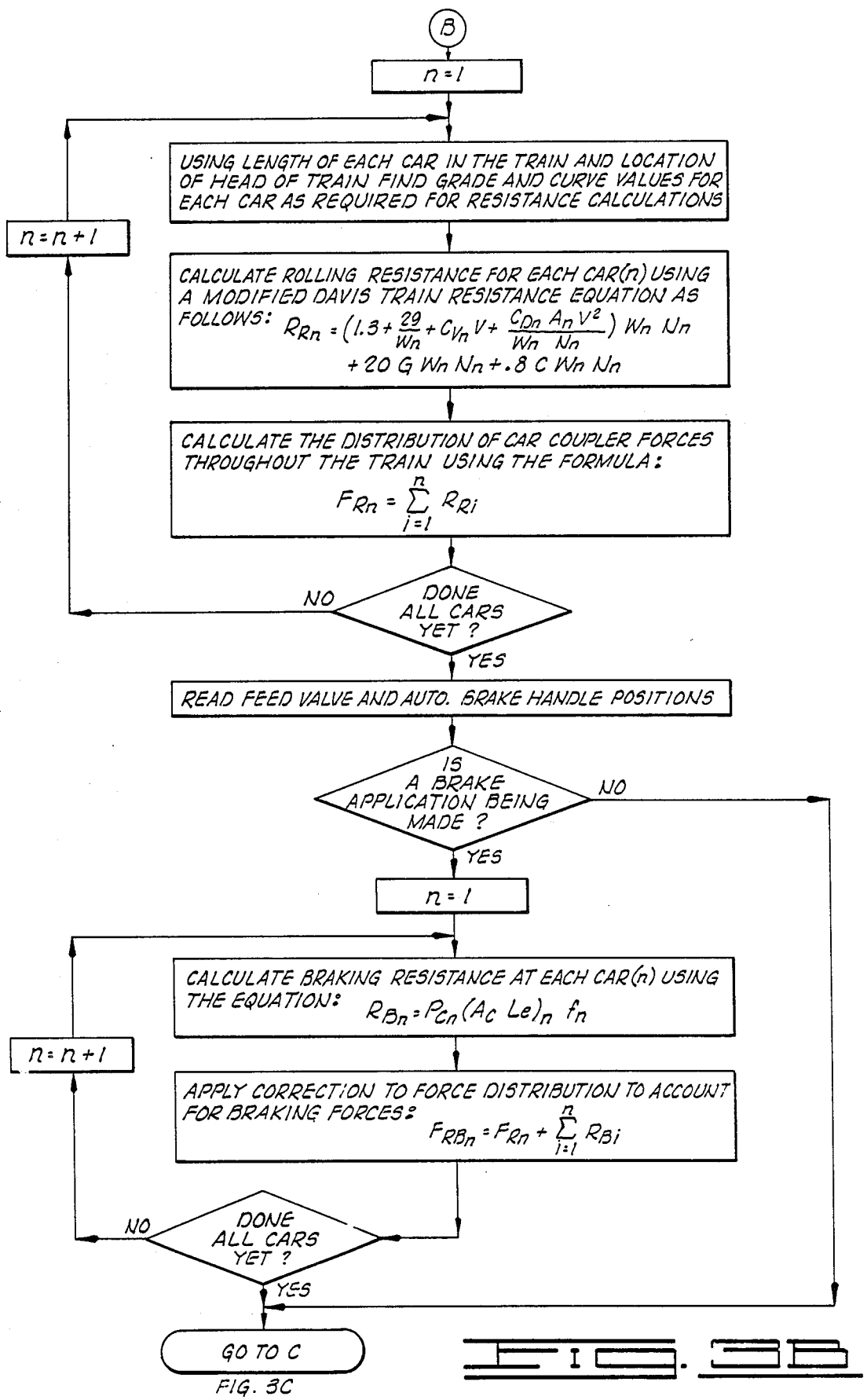
Figure 3C:
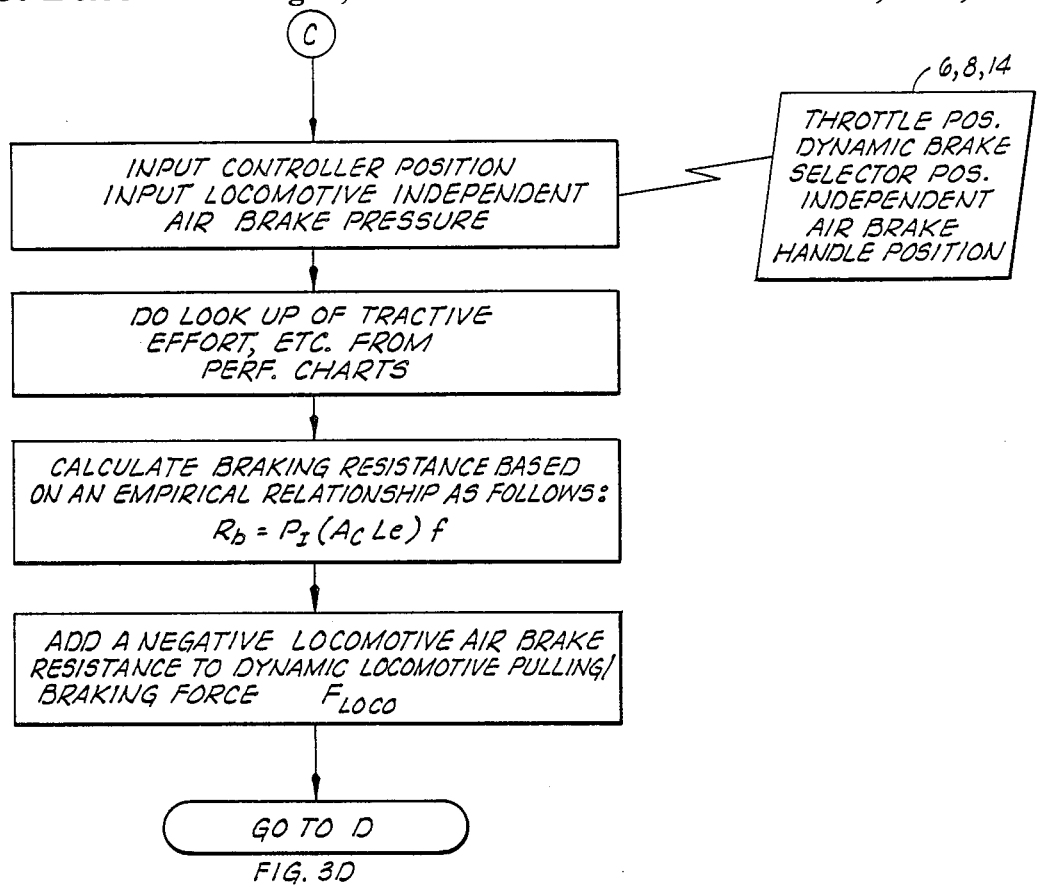
Figure 3E:
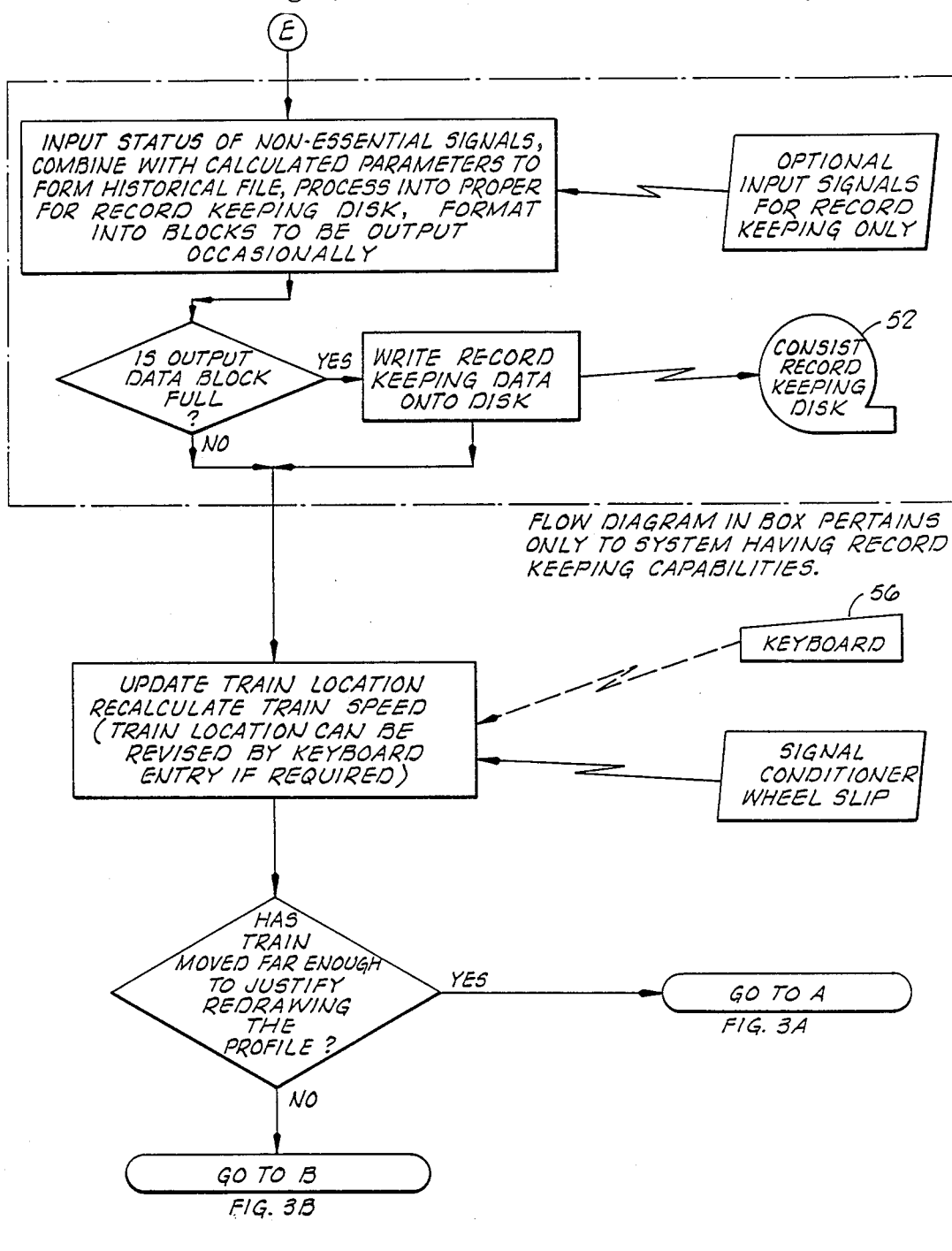

One advantage of using the computer 16 to handle the reception and transmission of the simulation signals is that it permits these signals to be calibrated via software rather than through hardware controls which were necessary in the previous system disclosed in the U.S. Pat. No. 4,041,283. The software for such calibration is contained in a master computer 32, thereby enabling a more simplified program as shown in FIG. 2 to be used in the computer 16 of the control station 4.

Another important feature of the present invention is that multiple control stations can be accommodated. These additional control stations are represented in FIG. 1 by a control station 4a. The control station 4a of the preferred embodiment is identical to the control station 4; however, it is contemplated that other types of control stations can be accommodated within the present invention. Each of the multiple control stations is connected to a respective serial data input port of the master computer 32. In FIG. 1, the serial data input port connected to the control station 4 is identified by the reference numeral 34, and the serial data input port connected to the control station 4a is identified by the reference numeral 34a.

The connections between the outputs of the control stations and the serial data input ports of the master computer 32 are established by respective serial communication link means. Each serial communication link means connects the computer of the respective control station to the master computer 32 so that a serial signal communication circuit, over which any of the respective signals communicable to the computer of the respective control station is communicable to the computer 32 from the computer of the respective control station, is thereby defined. In the preferred embodiment, the serial communication means between the control station 4 and the master computer 32 includes a three-wire cable 36 adapted to handle communications under conventional RS-232 protocol for which the respective interconnected ports of the microcomputer 16 and the master computer 32 are also adapted. The control station 4a is connected to the master computer 32 by a respective conventional serial communication means, including a three-wire cable 36a in the preferred embodiment represented in FIG. 1, which functions the same as the communication means interconnecting the control station 4 and the computer 32. This conventional serial communication link construction is of particular significance within the present invention because it replaces the wiring harness, containing significantly more than three wires, which is used in the system disclosed in the U.S. Pat. No. 4,041,283 to connect discrete signal generating elements of the control stand 225 to the computer 238 of that system. Also of significance is the use of a conventional protocol so that the master computer 32 of the present invention functions in response to any type of control stand simulating any type of device (e.g., a diesel locomotive or an electric locomotive), so long as the particular control stand complies with the protocol and provides the appropriate type of information needed by the simulator within which the apparatus of the present invention is to be used. Furthermore, through the use of the microcomputers within the control stations and the serial communication means illustrated in the preferred embodiments as including the components 36, 36a, the present invention is adapted to operate off of multiple control stands which can be concurrently operated by different students or operators.

The master computer 32 further includes a plurality of computer control terminal input ports, two of which are identified in FIG. 1 by the reference numerals 38, 38a. Each is connected to a respective one of a plurality of computer control terminals; thus, two are shown in FIG. 1 and identified respectively by the reference numerals 40, 40a. Although the computer control terminals of the preferred embodiment are subsequently described, the significance of the plurality of them and of the computer control terminal input ports of the master computer 32 is that the master computer 32, and thus the apparatus of the present invention, is adapted to be run in response to instructions from multiple locations, any of which can be remote from the master computer 32. Remote control can be achieved, for example, through a telephonic link established through a suitable, conventional modem 42.

The master computer 32 also includes multiple peripheral output ports, three of which are identified in FIG. 1 by the reference numerals 44a, 44b, 44c. These ports are used to connect to various peripherals, such as a color graphics display terminal 46, a plotter 48, and a printer 50 to be more particularly described hereinbelow.

In the preferred embodiment the master computer 32 particularly includes a microcomputer comprising a Motorola 68020 microprocessor, four megabytes of random access memory and an internal Winchester disk drive suitable for operating up to seventy megabytes of magnetic disk storage. This type of master computer 32 significantly increases the speed of operation of the apparatus of the present invention compared to the magnetic tape based system of the U.S. Pat. 4,041,283. (i.e., one or more magnetic disks 52 represented in FIGS. 3A-3E and run on the internal disk drive of the master computer 32 replace the magnetic tape storage device 240 of the U.S. Pat. No. 4,041,283).

The computer 32 operates under control of the program depicted in the flow chart of FIGS. 3A-3E. This program controls the interaction among the master computer 32 and any computer control terminals 40 and control stations 4 connected thereto. This program is the same as used in the system disclosed in the U.S. Pat. No. 4,041,283 except for some of the input and output devices from and to which the data flow as shown in FIGS. 3A-3E and except for the combination of the inputting steps shown in FIG. 3C and for the last output step and changed "GO TO E" step shown in FIG. 3D. Concerning the input and output devices, information is obtained by the master computer 32 from disk(s) 52 instead of from tape. Additionally, displays of the simulation information are made via the color graphics display terminal 46. Still further, all control, other than that made through one or more of the control stations 4, is implemented via one of the computer control terminals 40. Portions of the U.S. Pat. No. 4,041,283, which has been incorporated herein by reference, particularly pertinent to this program include the descriptions at column 11, line 56 –column 14, line 15 and column 16, line 50 –column 21, line 57.

Other programming capabilities include conventional techniques for permitting the master computer 32 to plot outputs through the plotter 48 and the printer 50. Examples of plotter outputs include the screen displays depicted in FIGS. 4-6. Another type of plottable display programmed to be output is one graphically showing locomotive characteristics. An example of this type of display is shown in FIG. 7 wherein the data of the identified locomotive characteristics have been obtained from a customer, for example, input into the computer 32 and then used to generate the graphical display of FIG. 7. Still another type of plottable display programmed to be displayed in the preferred embodiment is a brake simulation display frame wherein various brake pressure information is displayed separately from a frame of the type depicted in FIGS. 4-6. Examples of printer outputs include the reports contained in the Appendix of this specification. In addition to printing the reports shown in the Appendix, cyclic printing or displaying of selected parameters can be chosen. Other types of programming capabilities could readily be implemented. It is to be noted, however, that particular programming or software is not contemplated to be a part of the present invention claimed herein because for any specific type of equipment used and given the inputs, outputs and functions disclosed herein, it would be readily apparent to one having ordinary skill in the art how to write specific instructions for controlling such equipment to obtain such outputs and functions.

With respect to the tables shown in the Appendix, it is believed that the nature of the tables and the contents thereof are readily apparent to those having ordinary skill in the art. To a certain extent not here important, these tables are similar to ones which have been produced through the commercially used embodiment of the system disclosed in the U.S. Pat. No. 4,041,283. Others of these tables are expansions upon information previously, if at all, only output in summary manner through commercially used systems. One table, however, is of particular note.

This table is the "Total Energy Demand" table on page 3 of the Appendix. This table specifies energy demands, fuel consumption add percentage of total fuel consumption expended for the various phenomena or actions listed along the left-hand column of the Total Energy Demand table. Although the energy demand information has been computed and reported in previous commercial systems, the information contained in the two "fuel" columns has not, to our knowledge, been. In earlier systems, we are aware that an approximation of fuel consumption based on energy demands was suggested. In the present invention, however, more accurate indications of the simulated actual fuel consumption and percentage thereof are computed and listed for each individual phenomenon. This individual listing is of significance not only because it is believed to be more accurate but also because it gives a means by which the performance of two different students can be readily compared; that is, comparing the fuel consumption figures directly indicates which student performed the simulation with greater economic efficiency as to fuel usage. Thus, by providing the information in the particular Total Energy Demand table shown in the Appendix, the methodology of the present invention comprises printing onto hard copy a selectable table of a respective parameter from a plurality of parameters including the quantity of fuel consumed by each of a plurality of energy consuming phenomena.

In the preferred embodiment, each computer control terminal 40, 40a defines a means for controlling the mode of operation of the computer 32. Each such means includes a visual display screen distinct from the color graphics terminal 46. In the preferred embodiment, such visual display screen includes a cathode ray tube display screen (CRT) 54 of a conventional type. Each such means also includes a conventional keyboard 56. In the preferred embodiment, the cathode ray tube screen 54 and the keyboard 56 are part of a Model TM 3220 computer terminal by Motorola.

By way of example with reference only to the computer control terminal 40, the terminal 40 replaces the keyboard command console 234 of the system disclosed in the U.S. Pat. No. 4,041,283; however, the terminal 40 provides the same functions through the CRT 54 (specifically with respect to replacing the command console 234, the CRT 54 is used to display a "command console" screen corresponding to the functions implemented in hardware through the original command console 234). The functions performed by the terminal 40 include those described at column 8, line 31-column 10, line 10 of the U.S. Pat. No. 4,041,283.

Features which can be implemented through the terminal 40 include suitable diagnostic and calibration functions. Such diagnostics and calibration operations are examples of those which might be conveniently performed remotely from the site of the computer 32 and the control station 4 via the modem 42.

The color graphics display terminal 46 is of a suitable type, which in the preferred embodiment is a Model 8835 by Aydin; it is connected to the computer 32 through a VG640 interface by Matrox. The terminal 46 provides visual displays to the student or other simulator operator working at the control stand 4. Other color graphics display terminals (e.g., one is identified in FIG. 1 by the reference numeral 46a suitably interfaced to an output 44aa of the computer 32) would be included for use with additional control stations, such as the one identified by the reference numeral 4a. Each of these terminals would be used to perform the functions of the display module 244 of the system disclosed in the U.S. Pat. No. 4,041,283, which functions are described such as at column 10, line 36 column 11, line 55 of the U.S. Pat. No. 4,041,283. These broadly include displaying alphanumeric data and graphical representations generated by the computer 32 in response to the control signals received from the respective computer control terminals and control stations.

Figure 4:
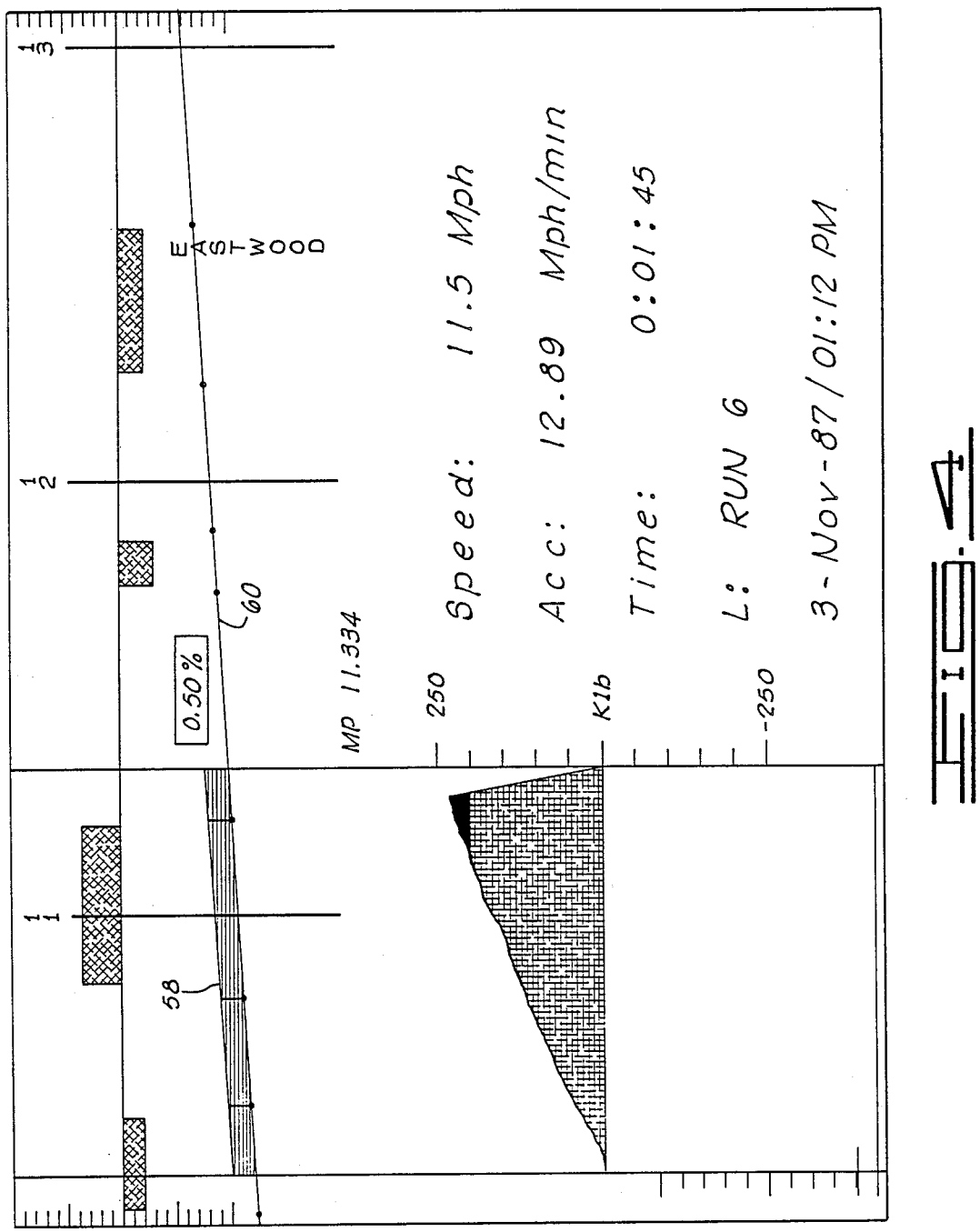
FIG. 4 is an illustrative display, from a color graphics display of the apparatus (and also illustrative of a display plottable via a plotter of the apparatus), showing a basic display of a length of track shown in one screen wherein the train extends through approximately one-third of the screen.
Figure 5:
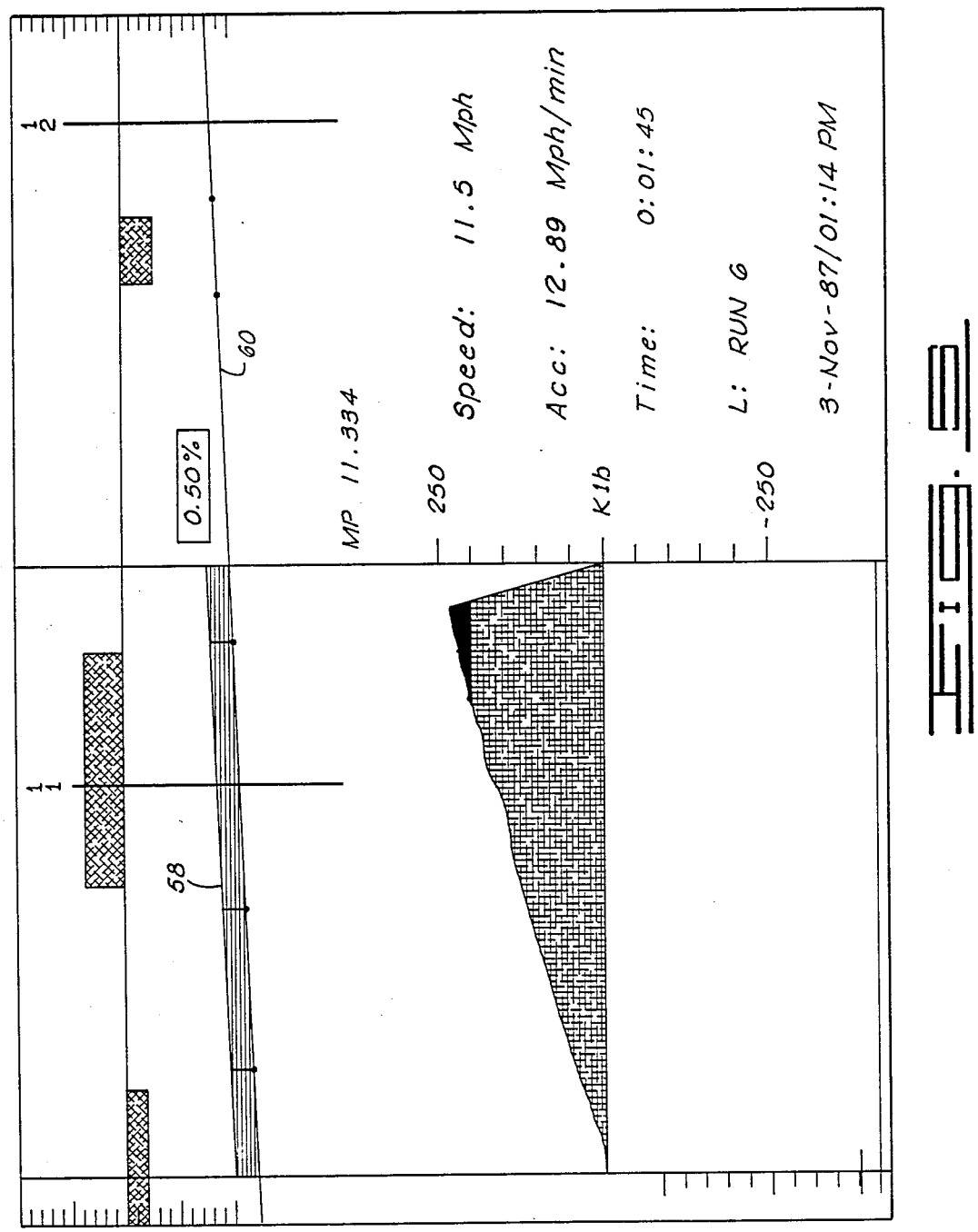
FIG. 5 is an illustrative display, from the color graphics display (and also plottable via the plotter), showing a segment of the track section shown in FIG. 4 but displayed on a different (specifically, larger) scale.
Figure 6:
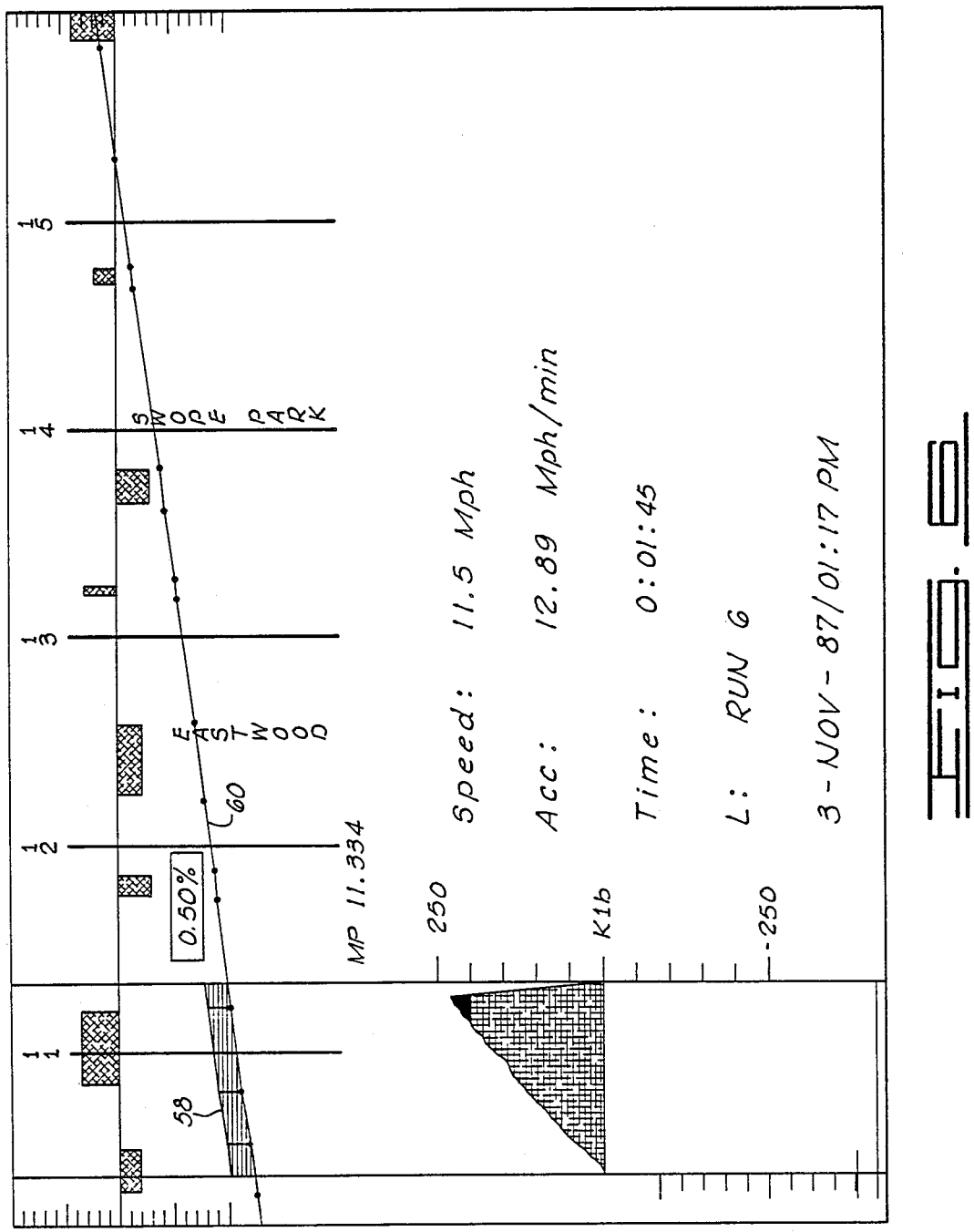
FIG. 6 is an illustrated display, from the color graphics display (and also plottable via the plotter), showing an increased length of track expanded from the section shown in FIG. 4 whereby the section shown in FIG. 4 is displayed on a different (specifically, smaller) scale.

An example of such data and representations is shown in FIG. 4. This depiction is comparable to those shown and described in the U.S. Pat. No. 4,041,283. In FIG. 4 the schematic representation of the railway train being simulated, which is identified by the reference numeral 58, is normally presented on the screen of the color graphics display terminal 46 so that the train 56 occupies approximately one-third of the lateral dimension of the color graphics display terminal 46; the train is represented on a track 60 extending across the entire width of the screen. From this normal presentation, however, the new methodology of the present invention permits the display to be varied to display more or less of the track 60 under consideration. In response to a suitable key function entered by the operator at the keyboard 56 of the control terminal 40, a portion of the normal display can be displayed at an increased or enlarged scale so that a particular segment of the section of track displayed in FIG. 4 is displayed across the entire screen of the color graphics display terminal 46. An example of this "zoom" feature is depicted in FIG. 5 wherein only the portion from the caboose of the train 56 to just beyond the 12-mile milepost is shown. Alternatively, a reduced scale can be selected through appropriate key functions to display more track than is typically displayed. An example of this is illustrated in FIG. 6 wherein the track section shown through the color graphics display terminal 46 is that portion from the caboose of the train 56 to the 16-mile milepost. In the preferred embodiment the amount of the scale change is determined by operator control of the cursor up/down keys on the keyboard 56 of the control terminal 40 (or other control terminal). This feature is of particular importance to simulations made to investigate train accidents.

The displays illustrated in FIGS. 4-6 are provided through the color graphics display terminal 46 during the actual simulation; however, these displays can be preserved for later use by transferring them onto hard copy. This is achieved in the present invention through use of the plotter 48, which is of a conventional type such as a Model 7550A by Hewlett-Packard. Other information can also be transferred onto hard copy through the printer 50 as previously described. The printer 50 performs the functions previously implemented through the teletypewriter 246 of the U.S. Pat. No. 4,041,283 system. The printer 50 in the preferred embodiment is a Model 252 by Centronics.

Through the assembly of the aforementioned components, the apparatus of the present invention is provided for use in simulating the operation and control of a railway train. It is through this equipment that there is provided data related to track profile, train consist, and location of the train on the track for a predetermined train and for a predetermined section of track over which the operation of the train is to be simulated. In general this can be accomplished, from a software methodology standpoint, in accordance with the system of the U.S. Pat. No. 4,041,283 or any other suitable system but merely adapted to accommodate the apparatus modifications described hereinabove. That is, the apparatus of the present invention is directed to the assembly of components described hereinabove. The methodology, on the other hand, relates not to any particular software control thereof but to the scaling feature with which the simulated train and track can be displayed and the providing of plotted graphical outputs and of specific printed fuel consumption information.

Thus, the present invention is well adapted to carry out the objects and attain the ends and advantages mentioned above as well as those inherent therein. While a preferred embodiment of the invention has been described for the purpose of this disclosure, changes in the construction and arrangement of parts and in the performance of the steps can be made by those skilled in the art, which changes are encompassed within the spirit of this invention as defined by the appended claims.

Appendix

| RUN SUMMARY | | | | |
|---|---|---|---|---|
| | Time | Duration | Location | Distance (Miles) |
| Run | 00:00:00 | 00:00:00 | 1234567.890 | 0.000 |
| Run | 00:00:00 | 00:00:00 | 1234567.890 | 0.000 |
| Run | 00:00:00 | 00:00:00 | 1234567.890 | 0.000 |

| -continued RUN SUMMARY | | | | |
|---|---|---|---|---|
| | Time | Duration | Location | Distance (Miles) |
| Run | 00:00:00 | 00:00:00 | 1234567.890 | 0.000 |
| Run | 00:00:00 | 00:00:00 | 1234567.890 | 0.000 |
| Run | 00:00:00 | 00:00:00 | 1234567.890 | 0.000 |
| Run | 00:00:00 | 00:00:00 | 1234567.890 | 0.000 |
| Run | 00:00:00 | 00:00:00 | 1234567.890 | 0.000 |
| Run | 00:00:00 | 00:00:00 | 1234567.890 | 0.000 |
| Run | 00:00:00 | 00:00:03 | 1234567.890 | 0.000 |

| TOTAL RUN SUMMARY | | |
|---|---|---|
| | Duration | Distance (Miles) |
| Run | 00:00:03 | 0.000 |
| Stop | 00:00:00 | 0.000 |
| Bad | 00:00:00 | 0.000 |
| Total | 00:00:03 | 0.000 |
| | Time | Location |
| Start | 00:00:00 | 94.643 |
| End | 00:00:03 | 94.643 |

| CONSIST SUMMARY | |
|---|---|
| Consist name: | RCE100 |
| Instructor: | SPECIAL TEST |
| Last updated: | 17-Jun-87 |
| Lead locomotive: | SD40/A00 |
| 0 | Loads |
| 91 | Empties |
| 91 | Cars |
| 9 | Locomotives |
| 100 | TOTAL |
| 4689.0 | Length (Ft) |
| 2093 | Net weight (Tons) |
| 3749 | Gross weight (Tons) |
| 0 | Lading weight (Tons) |
| 37 | Weight/brake (Tons/brake) |
| 53.0 | Net brake (%) |
| 27000 | Locomotive power (Hp) |
| 7.20 | Power/Weight (Hp/ton) |

| PROFILE SUMMARY |
|---|
| Profile name: KC 0-117 |

| TOTAL ENERGY DEMAND | | | |
|---|---|---|---|
| | Energy Demand (Hp-Hrs) | Fuel (Gallons) | Fuel |
| Acceleration | 0.53 | 0.09 | 49.44% |
| Air Brake | | | |
| Slow Down | 0.00 | 0.00 | 0.00% |
| Grade Balance | 0.00 | 0.00 | 0.00% |
| Power Brake | 0.19 | 0.03 | 18.54% |
| Dynamic Brake | | | |
| Slow Down | 0.00 | 0.00 | 0.00% |
| Grade Balance | 0.00 | 0.00 | 0.00% |
| Power Brake | 0.00 | 0.00 | 0.00% |
| Curve Resistance | 0.00 | 0.00 | 0.00% |
| Grade Resistance | 0.06 | 0.01 | 5.06% |
| Rolling Resistance | 0.01 | 0.00 | 1.12% |
| Idle | 0.00 | 0.05 | 25.28% |
| Traction | 0.80 | 0.18 | 100.00% |

| SPEED BRAKE FUEL INFORMATION | | | | | |
| --- | --- | --- | --- | --- | --- |
| | | Average | Minimum | Maximum | Current |
| Speed | (Mph) | 0.00 | −0.01 | 1.47 | 1.47 |
| Moving Speed | (Mph) | 0.00 | −0.01 | 1.47 | 1.47 |
| Work Efficiency | (TM/G) | 0.00 | 0.00 | 0.00 | 0.00 |
| Air Flow | (SCFM) | | 22.73 | 190.04 | 188.20 |
| Feed Valve | (Psi) | | 79.85 | 79.85 | 79.85 |
| Leakage | (Psi/min) | | 3.80 | 3.80 | 3.80 |

| MAXIMUM FORCES (Klbs) | | | |
| --- | --- | --- | --- |
| Time | Location | Car | Run-In Force |
| 00:00:02 | 94.643 | 55 | −81.37 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| Time | Location | Car | Run-Out Force |
| 00:00:03 | 94.643 | 96 | 47.94 |
| 00:00:02 | 94.643 | 50 | 44.22 |
| 00:00:02 | 94.643 | 47 | 9.17 |
| 00:00:01 | 94.643 | 50 | 5.28 |
| 00:00:00 | 94.643 | 98 | 0.02 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| Time | Location | Car | Steady Force |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |
| 00:00:00 | 1234567.890 | 0 | 0.00 |

| LOCOMOTIVE DUTY CYCLE | | | | |
| --- | --- | --- | --- | --- |
| Throttle | Duration | Distance (Miles) | Fuel (Gallons) | Entries |
| Bad | 00:00:00 | 0.000 | 0.00 | 0 |
| DB Setup | 00:00:00 | 0.000 | 0.00 | 0 |
| DB 1 | 00:00:00 | 0.000 | 0.00 | 0 |
| DB 2 | 00:00:00 | 0.000 | 0.00 | 0 |
| DB 3 | 00:00:00 | 0.000 | 0.00 | 0 |
| DB 4 | 00:00:00 | 0.000 | 0.00 | 0 |
| DB 5 | 00:00:00 | 0.000 | 0.00 | 0 |
| DB 6 | 00:00:00 | 0.000 | 0.00 | 0 |
| DB 7 | 00:00:00 | 0.000 | 0.00 | 0 |
| DB 8 | 00:00:00 | 0.000 | 0.00 | 0 |

-continued

| LOCOMOTIVE DUTY CYCLE | | | | |
| --- | --- | --- | --- | --- |
| Throttle | Duration | Distance (Miles) | Fuel (Gallons) | Entries |
| Idle | 00:00:00 | 0.000 | 0.00 | 0 |
| Run 1 | 00:00:00 | 0.000 | 0.00 | 0 |
| Run 2 | 00:00:00 | 0.000 | 0.00 | 0 |
| Run 3 | 00:00:00 | 0.000 | 0.00 | 0 |
| Run 4 | 00:00:00 | 0.000 | 0.00 | 0 |
| Run 5 | 00:00:03 | 0.000 | 0.10 | 1 |
| Run 6 | 00:00:00 | 0.000 | 0.00 | 0 |
| Run 7 | 00:00:00 | 0.000 | 0.00 | 0 |
| Run 8 | 00:00:00 | 0.000 | 0.00 | 0 |
| Stop | 00:00:00 | 0.000 | 0.00 | 0 |
| Total | 00:00:03 | 0.000 | 0.10 | 1 |

| REMOTE DUTY CYCLE | | | | |
| --- | --- | --- | --- | --- |
| Throttle | Duration | Distance (Miles) | Fuel (Gallons) | Entries |
| Bad | 00:00:00 | 0.000 | 0.00 | 0 |
| DB Setup | 00:00:00 | 0.000 | 0.00 | 0 |
| DB 1 | 00:00:00 | 0.000 | 0.00 | 0 |
| DB 2 | 00:00:00 | 0.000 | 0.00 | 0 |
| DB 3 | 00:00:00 | 0.000 | 0.00 | 0 |
| DB 4 | 00:00:00 | 0.000 | 0.00 | 0 |
| DB 5 | 00:00:00 | 0.000 | 0.00 | 0 |
| DB 6 | 00:00:00 | 0.000 | 0.00 | 0 |
| DB 7 | 00:00:00 | 0.000 | 0.00 | 0 |
| DB 8 | 00:00:00 | 0.000 | 0.00 | 0 |
| Idle | 00:00:00 | 0.000 | 0.00 | 0 |
| Run 1 | 00:00:00 | 0.000 | 0.00 | 0 |
| Run 2 | 00:00:00 | 0.000 | 0.00 | 0 |
| Run 3 | 00:00:00 | 0.000 | 0.00 | 0 |
| Run 4 | 00:00:00 | 0.000 | 0.00 | 0 |
| Run 5 | 00:00:03 | 0.000 | 0.08 | 1 |
| Run 6 | 00:00:00 | 0.000 | 0.00 | 0 |
| Run 7 | 00:00:00 | 0.000 | 0.00 | 0 |
| Run 8 | 00:00:00 | 0.000 | 0.00 | 0 |
| Stop | 00:00:00 | 0.000 | 0.00 | 0 |
| Total | 00:00:03 | 0.000 | 0.08 | 1 |

| BRAKE CYCLE | | | | |
| --- | --- | --- | --- | --- |
| Position | Duration | Distance (Miles) | Fuel (Gallons) | Entries |
| Release | 00:00:03 | 0.000 | 0.13 | 1 |
| Minimum Service | 00:00:00 | 0.000 | 0.00 | 0 |
| Minimum Service to Full Service | 00:00:00 | 0.000 | 0.00 | 0 |
| Full Service | 00:00:00 | 0.000 | 0.00 | 0 |
| Handle Off | 00:00:00 | 0.000 | 0.00 | 0 |
| Emergency | 00:00:00 | 0.000 | 0.00 | 0 |
| Total | 00:00:03 | 0.000 | 0.13 | 1 |

| LOCOMOTIVE INDEPENDENT CYCLE | | | | |
| --- | --- | --- | --- | --- |
| Position | Duration | Distance (Miles) | Fuel (Gallons) | Entries |
| Application | 00:00:03 | 0.000 | 0.10 | 1 |

-continued

LOCOMOTIVE INDEPENDENT CYCLE

| Position | Duration | Distance (Miles) | Fuel (Gallons) | Entries |
|---|---|---|---|---|
| Release | 00:00:00 | 0.000 | 0.00 | 0 |
| Total | 00:00:03 | 0.000 | 0.10 | 1 |

REMOTE INDEPENDENT CYCLE

| Position | Duration | Distance (Miles) | Fuel (Gallons) | Entries |
|---|---|---|---|---|
| Application | 00:00:00 | 0.000 | 0.00 | 0 |
| Release | 00:00:03 | 0.000 | 0.08 | 1 |
| Total | 00:00:03 | 0.000 | 0.08 | 1 |

LOCOMOTIVE POWER BRAKE

| Time | Duration | Location | Distance (Miles) |
|---|---|---|---|
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:01 | 00:00:02 | 94.643 | 0.000 |

REMOTE POWER BRAKE

| Time | Duration | Location | Distance (Miles) |
|---|---|---|---|
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:01 | 00:00:02 | 94.643 | 0.000 |

LOCOMOTIVE WHEEL SLIP

| Time | Duration | Location | Distance (Miles) | Speed (Mph) |
|---|---|---|---|---|
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |

-continued

LOCOMOTIVE WHEEL SLIP

| Time | Duration | Location | Distance (Miles) | Speed (Mph) |
|---|---|---|---|---|
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |

REMOTE WHEEL SLIP

| Time | Duration | Location | Distance (Miles) | Speed (Mph) |
|---|---|---|---|---|
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |

SPEED LIMIT

| Time | Duration | Location | Distance (Miles) | Speed (Mph) | Limit (Mph) |
|---|---|---|---|---|---|
| 00:00:00 | 00:00:00 | 1234567.890 | 0.000 | 0.00 | 0.00 |
| 00:00:00 | 00:00:00 | 1234567.890 | 0.000 | 0.00 | 0.00 |
| 00:00:00 | 00:00:00 | 1234567.890 | 0.000 | 0.00 | 0.00 |
| 00:00:00 | 00:00:00 | 1234567.890 | 0.000 | 0.00 | 0.00 |
| 00:00:00 | 00:00:00 | 1234567.890 | 0.000 | 0.00 | 0.00 |
| 00:00:00 | 00:00:00 | 1234567.890 | 0.000 | 0.00 | 0.00 |
| 00:00:00 | 00:00:00 | 1234567.890 | 0.000 | 0.00 | 0.00 |
| 00:00:00 | 00:00:00 | 1234567.890 | 0.000 | 0.00 | 0.00 |
| 00:00:00 | 00:00:00 | 1234567.890 | 0.000 | 0.00 | 0.00 |
| 00:00:00 | 00:00:00 | 1234567.890 | 0.000 | 0.00 | 0.00 |
| 00:00:00 | 00:00:00 | 1234567.890 | 0.000 | 0.00 | 0.00 |
| 00:00:00 | 00:00:00 | 1234567.890 | 0.000 | 0.00 | 0.00 |
| 00:00:00 | 00:00:00 | 1234567.890 | 0.000 | 0.00 | 0.00 |
| 00:00:00 | 00:00:00 | 1234567.890 | 0.000 | 0.00 | 0.00 |

UNDESIRED RELEASE

| Time | Duration | Location | Distance (Miles) |
|---|---|---|---|
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |
| 00:00:00 | 00:00:00 | 1234567.890 | 0.000 |

| LOCOMOTIVE SAND APPLY | | | | |
| --- | --- | --- | --- | --- |
| Time | Duration | Location | Distance (Miles) | Speed (Mph) |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |

| REMOTE SAND APPLY | | | | |
| --- | --- | --- | --- | --- |
| Time | Duration | Location | Distance (Miles) | Speed (Mph) |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |
| 00:00:00 | 00:00:00 | 1234567.890 | 0.000 | 0.00 |

SHORT SUMMARY

| Profile | Consist | |
| --- | --- | --- |
| KC 0-117 | SPECIAL TEST/RCE100 | |
| | Time | Location |
| Start | 00:00:00 | 94.643 |
| End | 00:00:03 | 94.643 |

| Description | Locomotive | Remote | Total | Description | Total |
| --- | --- | --- | --- | --- | --- |
| Wheel Lock | 0 | 0 | 0 | Application | 0 |
| Wheel Slip | 0 | 0 | 0 | Release | 1 |
| | | | | Emergency Stop | 0 |
| Independent Application | 1 | 0 | 1 | | |
| Independent Release | 0 | 1 | 1 | Run | 0 |
| Power Brake | 1 | 1 | 2 | Bad | 0 |
| Sand | 0 | 0 | 0 | Speed Limit | 0 |

| Averages | | | Totals | | |
| --- | --- | --- | --- | --- | --- |
| Speed | (Mph) | 0.00 | Distance | (Miles) | 0.000 |
| Work Efficiency | (TM/G) | 0.00 | Fuel | (Gallons) | 0.18 |

What is claimed is:

1. An apparatus for use in simulating operation and control of a railway train, comprising:
    a control station including:
        a plurality of train operating controls, each for providing a respective signal related to the degree of operation thereof by a control station operator; and
        a first computer connected to said plurality of train operating controls so that a plurality of signal transmission circuits, over which the respective signals from said train operating controls are communicable to said first computer, are defined;
    display means for displaying alphanumeric data and graphical representations to depict the operation and control of a railway train to be simulated;
    a second computer including an output connected to said display means; and
    serial communication link means for connecting said first computer and said second computer so that a serial signal communication circuit, over which any of the respective signals communicable to said first computer are communicable to said second computer from said first computer, is defined between said first and second computers.

2. An apparatus as defined in claim 1, wherein said second computer further includes a plurality of serial data input ports adapted to be connected to a plurality of control stations, one of said serial data input ports connected to said serial communication link means.

3. An apparatus as defined in claim 1, wherein:
    said apparatus further comprises a computer control terminal including a cathode ray tube display screen and a keyboard connected thereto; and
    said second computer further includes a plurality of computer control terminal input ports adapted to be connected to a plurality of computer control terminals, one of said computer control terminal input ports connected to said computer control terminal which includes said cathode ray tube display screen and said keyboard.

4. An apparatus as defined in claim 1, wherein:
    said display means includes a color graphics terminal connected to said second computer; and
    said apparatus further comprises:
        a printer connected to said second computer so that alphanumeric data displayed through said color graphics terminal are printable onto hard copy; and
        a plotter connected to said second computer so that graphical representations displayed through said color graphics terminal are plottable onto hard copy.

5. An apparatus as defined in claim 1, further comprising means for controlling the mode of operation of said second computer, said means connected to said second computer and including a visual display screen, distinct from said display means, and a keyboard connected with said visual display screen.

6. An apparatus for use in simulating operation and control of a railway train, comprising:
    a first control station, including:
        a first microcomputer including a plurality of input ports and an RS-232 output port to which data received at said input ports are transferred;
        a first power throttle connected to a first one of said input ports of said first microcomputer;
        a first dynamic brake control connected to a second one of said input ports of said first microcomputer;
        a first train line air brake valve connected to a third one of said input ports of said first microcomputer;
        a first independent locomotive air brake valve connected to a fourth one of said input ports of said first microcomputer; and a first sanding wobble stick connected to a fifth one of said input ports of said first microcomputer;
a second control station, including:
- a second microcomputer including a plurality of input ports and an RS-232 output port to which data received at said input ports of said second microcomputer are transferred;
- a second power throttle connected to a first one of said input ports of said second microcomputer;
- a second dynamic brake control connected to a second one of said input ports of said second microcomputer;
- a second train line air brake valve connected to a third one of said input ports of said second microcomputer;
- a second independent locomotive air brake valve connected to a fourth one of said input ports of said second microcomputer; and
- a second sanding wobble stick connected to a fifth one of said input ports of said second microcomputer;
a third microcomputer, including:
- a first RS-232 input port connected to said RS-232 output port of said first microcomputer;
- a second RS-232 input port connected to said RS-232 port of said second microcomputer;
- a first control input port;
- a second control input port; and
- a plurality of output ports;
a first computer control terminal, including a first cathode ray tube screen and a first keyboard, connected to said first control input port of said second microcomputer;
a second computer control terminal, including a second cathode ray tube screen and a second keyboard, connected to said second control input port of said second microcomputer;
a color graphics display terminal connected to a first one of said output ports of said third microcomputer;
a plotter connected to a second one of said output ports of said third microcomputer; and
a printer connected to a third one of said output ports of said third microcomputer.

* * * * *